US008640864B2

(12) United States Patent
Chen et al.

(10) Patent No.: US 8,640,864 B2
(45) Date of Patent: Feb. 4, 2014

(54) FOLDABLE COVER

(75) Inventors: Shih-Ying Chen, Taipei (TW);
Hsin-Hsuan Hsieh, Taipei (TW);
You-Ren Chen, Taipei (TW);
Cheng-Chih Hung, Taipei (TW)

(73) Assignee: ASUSTeK Computer Inc., Taipei City (TW)

( * ) Notice: Subject to any disclaimer, the term of this patent is extended or adjusted under 35 U.S.C. 154(b) by 0 days.

(21) Appl. No.: 13/585,843

(22) Filed: Aug. 15, 2012

(65) Prior Publication Data
US 2013/0043148 A1    Feb. 21, 2013

Related U.S. Application Data

(60) Provisional application No. 61/525,172, filed on Aug. 18, 2011.

(51) Int. Cl.
*B65D 85/00*      (2006.01)
(52) U.S. Cl.
USPC ............................. 206/45.2; 206/320; 248/454
(58) Field of Classification Search
USPC ................. 206/45.2, 45.23, 45.24, 320, 576; 248/450, 455, 458, 459, 460, 465, 454
See application file for complete search history.

(56) References Cited

U.S. PATENT DOCUMENTS

| 5,607,054 | A | * | 3/1997 | Hollingsworth | 206/320 |
|---|---|---|---|---|---|
| 8,016,107 | B2 | * | 9/2011 | Emsky | 206/320 |
| 8,230,992 | B2 | * | 7/2012 | Law et al. | 206/320 |
| 8,245,843 | B1 | * | 8/2012 | Wu | 206/320 |
| 8,253,518 | B2 | * | 8/2012 | Lauder et al. | 335/219 |
| 8,281,924 | B2 | * | 10/2012 | Westrup | 206/320 |
| 8,424,830 | B2 | * | 4/2013 | Yang et al. | 248/459 |
| 2009/0230161 | A1 | * | 9/2009 | Emsky | 224/257 |
| 2012/0006951 | A1 | * | 1/2012 | Lin | 248/188.6 |
| 2012/0181195 | A1 | * | 7/2012 | Lu et al. | 206/320 |
| 2012/0211613 | A1 | * | 8/2012 | Yang et al. | 248/174 |
| 2012/0211631 | A1 | * | 8/2012 | Lu et al. | 248/371 |
| 2012/0248277 | A1 | * | 10/2012 | Yang et al. | 248/346.3 |

FOREIGN PATENT DOCUMENTS

| CN | 301517641 | 4/2011 |
|---|---|---|
| GB | 2402869 | 12/2004 |

* cited by examiner

*Primary Examiner* — Jacob K Ackun
(74) *Attorney, Agent, or Firm* — Jianq Chyun IP Office

(57) ABSTRACT

A foldable cover for protecting or supporting a portable electronic device is provided. The foldable cover comprises a supporting unit and a fixing unit. The supporting unit comprises a plurality of first separations, a convergent part and a plurality of first slab-shaped parts. Each first separation is connected to the convergent part. The fixing unit is connected to the supporting unit to fix the portable electronic device. When the first slab-shaped parts are located at the same surface, the supporting unit covers the portable electronic device. When a three dimensional structure is formed by the first separations, the convergent part and the first slab-shaped parts, the supporting unit supports the portable electronic device.

8 Claims, 11 Drawing Sheets

FOLDABLE COVER

CROSS-REFERENCE TO RELATED APPLICATION

This application claims the priority benefits of U.S. provisional application Ser. No. 61/525,172, filed on Aug. 18, 2011. The entirety of the above-mentioned patent application is hereby incorporated by reference herein and made a part of this specification.

BACKGROUND

1. Field of the Invention

The invention relates to a foldable cover, and in particular, to a foldable cover adapted to protect or support a portable electronic device.

2. Description of Related Art

Portable electronic devices are suitable to be carried by a user. However, a portable electronic device may be damaged due to be bumped or hit, or wear down the outer casing, when being carried. In order to avoid damage, a protective cover is generally used to cover the portable electronic device for protection.

In addition, when viewing some information on a portable electronic device such as a tablet PC, the portable electronic device is usually disposed on a supporter with a suitable angle for the user to use. Thus, not only a protective cover is required, but also a supporter, thus to improve the convenience while using. However, buying and carrying multiple items is a burden for the user.

SUMMARY OF THE INVENTION

The disclosure provides a foldable cover, adapted to protect or support a portable electronic device. The foldable cover comprises a supporting unit and a fixing unit. The supporting unit comprises a plurality of first separations, a convergent part, and a plurality of first slab-shaped parts, wherein each first separation is connected to the convergent part.

The fixing unit is connected to the supporting unit, so as to fix the portable electronic device. When the first slab-shaped parts are located on the same surface, the supporting unit covers the portable electronic device. When a three dimensional structure is formed by the first separations, the convergent part, and the first slab-shaped parts, the supporting unit supports the portable electronic device.

Based on the three dimensional structure, the foldable cover of the disclosure not only protects the portable electronic device, but can also conveniently turn into a support frame to support the portable electronic device. In addition, the foldable cover of the disclosure can be placed in any directions so as to provide multiple angles to support the portable electronic device.

In order to make the aforementioned and other features and advantages of the disclosure more comprehensible, embodiments accompanying figures are described in detail below.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1A:
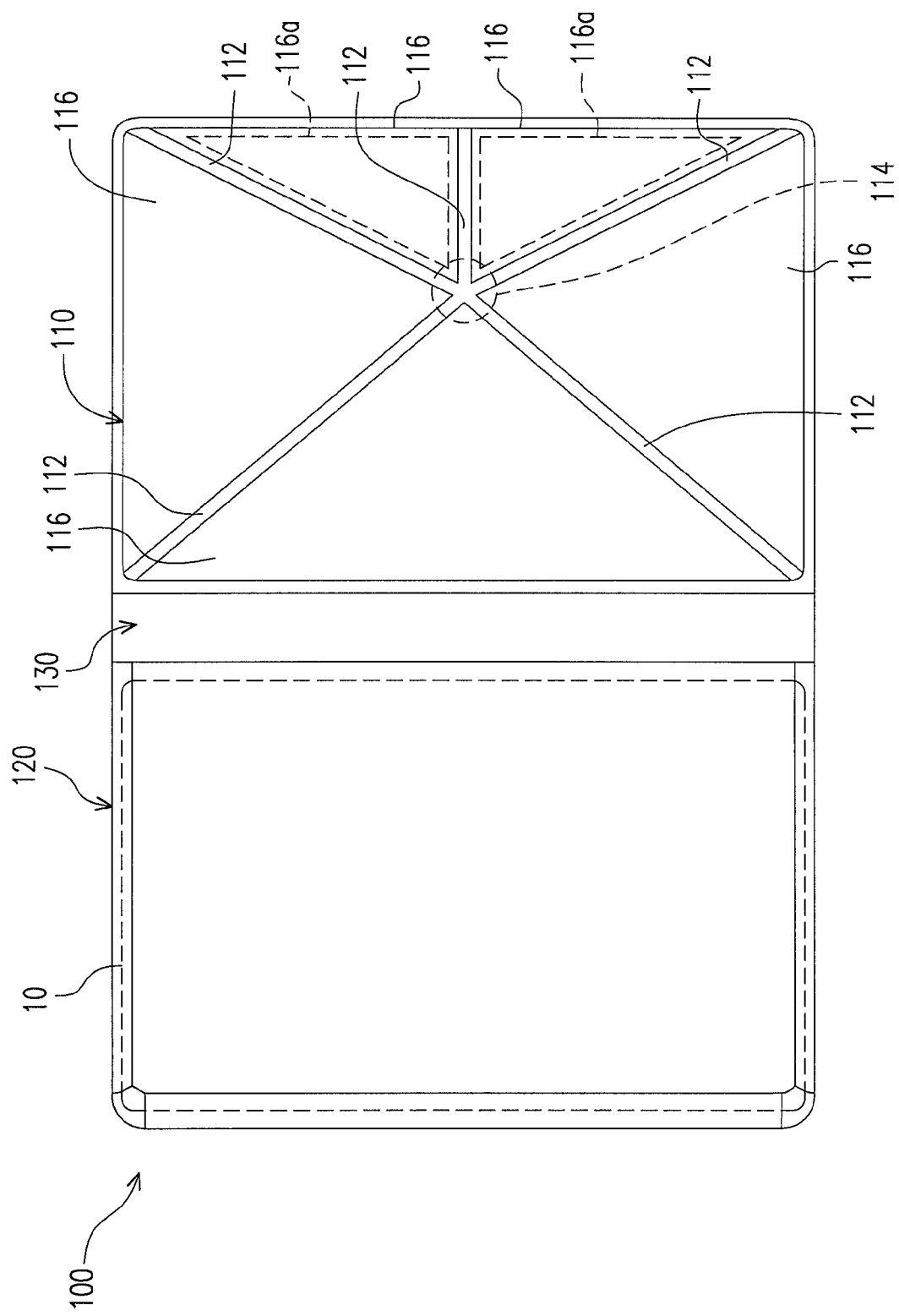
FIG. 1A is a top view illustrating a foldable cover according to a first embodiment of the disclosure.

The disclosure provides a foldable cover 100, adapted to protect or support a portable electronic device 10. FIG. 1A is a top view illustrating a foldable cover according to a first embodiment of the disclosure. The foldable cover 100 of the embodiment comprises a supporting unit 110, a fixing unit 120, and a connection member 130. The connection member 130 is connected between the supporting unit 110 and the fixing unit 120.

In the embodiment, the connection member 130 is a flexible element. However, in other embodiments, the connection member 130 can be a magnetic element or a locking element. The type of the connection member 130 is not limited thereto.

The supporting unit 110 comprises a plurality of first separations 112, a convergent part 114, and a plurality of first slab-shaped parts 116. Each of the first separations 112 is connected to the convergent part 114, and respectively partitions two adjacent first slab-shaped parts 116. The first slab-shaped parts 116 can be connected to each other through various connecting methods. In the embodiment, two adjacent first slab-shaped parts 116 respectively include a fixing part 116a. Two fixing parts 116a are fixed through attraction, so that the supporting unit 110 forms a three dimensional structure so as to support the portable electronic device 10.

As shown in FIG. 1A, the shape of the supporting unit 110 is a rectangle, with two long sides and two short sides. The shapes of the first slab-shaped parts 116 are triangles. In the embodiment, the convergent part 114 is located on a perpendicular bisector of the long side of the supporting unit 110. One of the first separations 112 is simultaneously located on the perpendicular bisector. Of course, the shape of the supporting unit 110 and the first slab-shaped parts 116, and the location of the convergent part 114 are not limited thereto.

The fixing unit 120 is used to place and fix the portable electronic device 10. The portable electronic device 10 can be locked to the edge of the fixing unit 120. In an embodiment, the edge of the fixing unit 120 is flexible. The portable electronic device 10 can be fixed to or separated from the fixing unit 120 by simply bending the portion that locks the fixing unit 120 and the portable electronic device 10. Herein, the other fixing methods of the embodiment are omitted. One skilled in the art can use other fixing methods without departing from the scope of the disclosure.

Figure 1B:
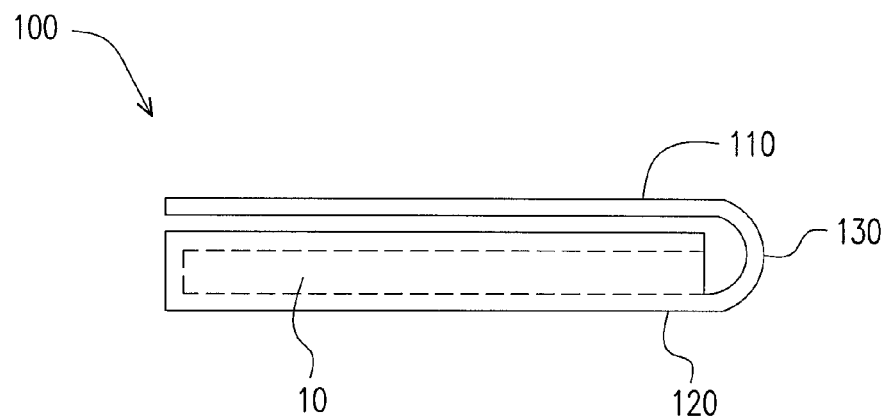
FIG. 1B is a schematic side view of the foldable cover of FIG. 1A covering a portable electronic device.

FIG. 1B is a schematic side view of the foldable cover of FIG. 1A covering a portable electronic device. As shown in FIG. 1B, when the foldable cover 100 of the embodiment protects the portable electronic device 10, the portable electronic device 10 is placed in the fixing unit 120, and the supporting unit 110 covers the portable electronic device 10. At this point, each first slab-shaped part 116 is located on the same surface.

Figure 1C:
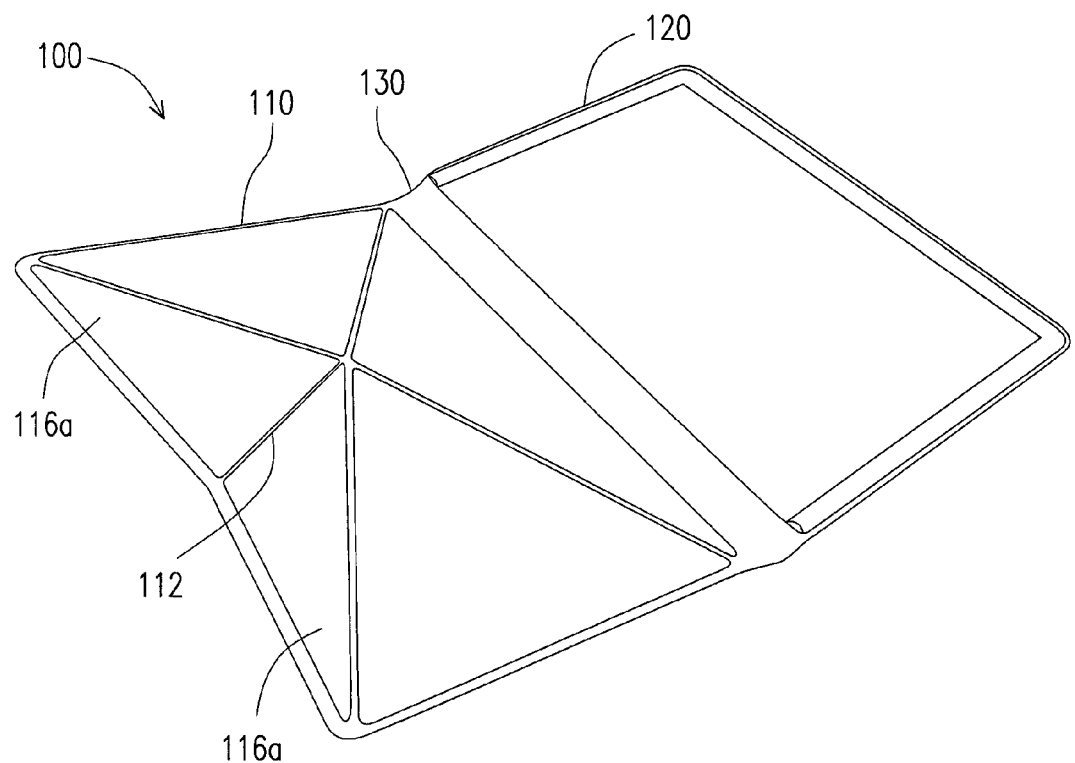
FIG. 1C is a three dimensional schematic view of the foldable cover of FIG. 1A that is folded.
Figure 1D:
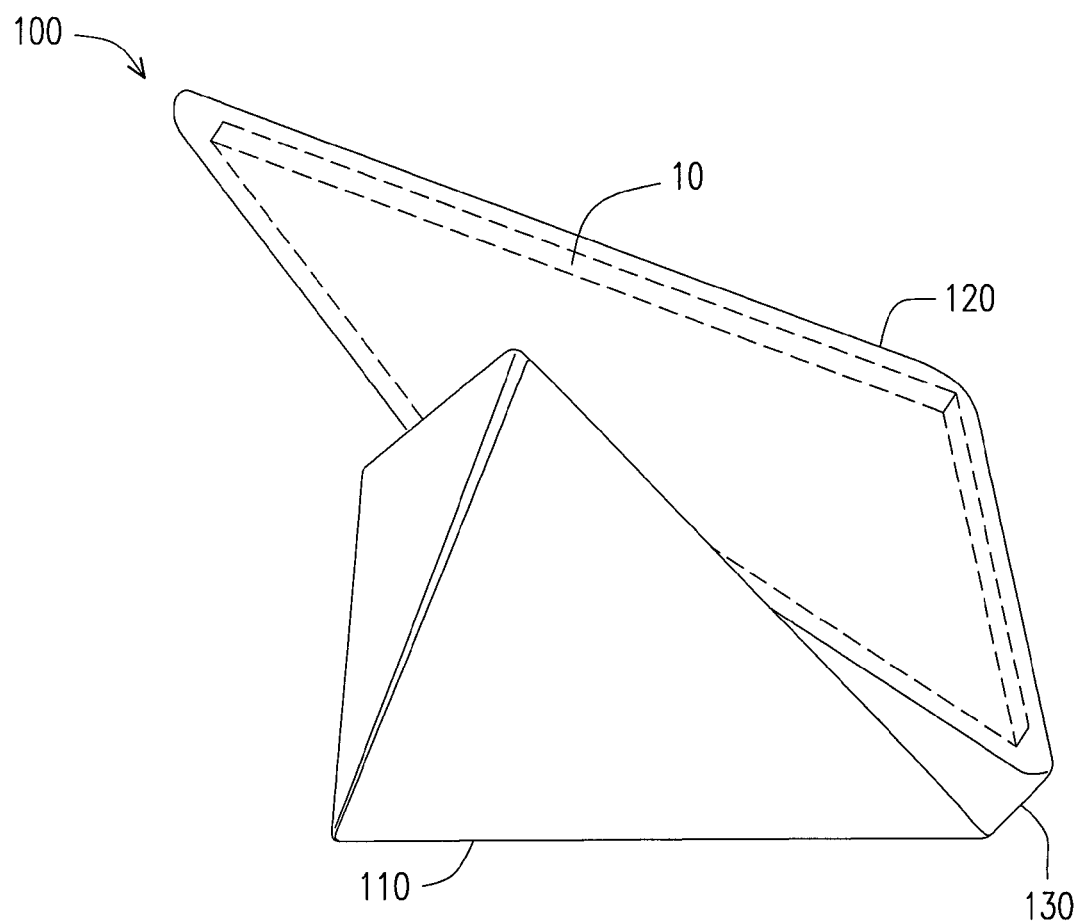
FIG. 1D to FIG. 1F are three dimensional schematic views of the foldable cover of FIG. 1A deforming to support the portable electronic device.
Figure 1E:
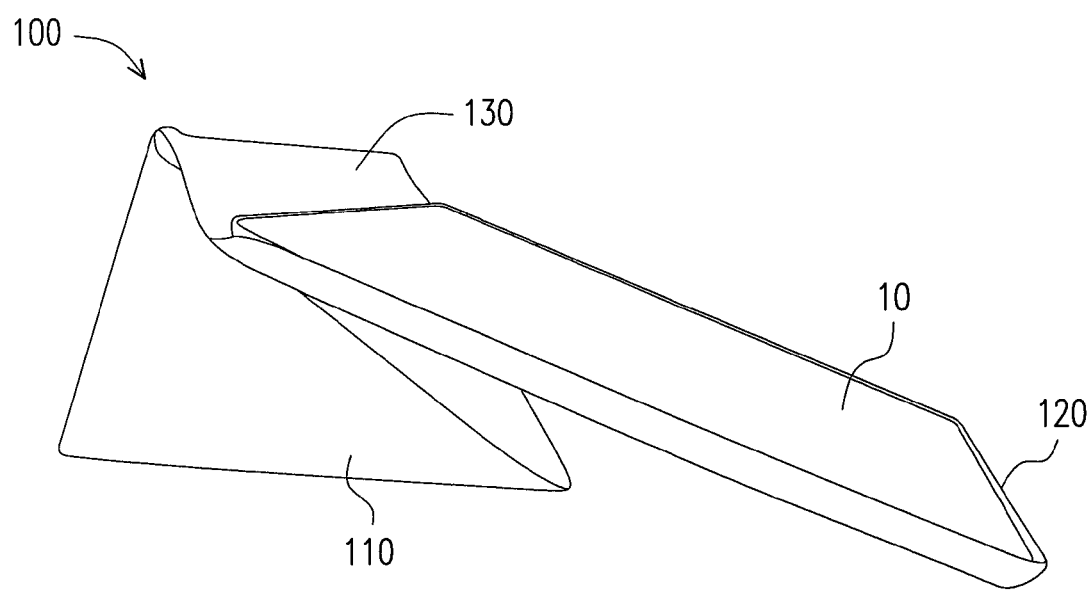
Figure 1F:
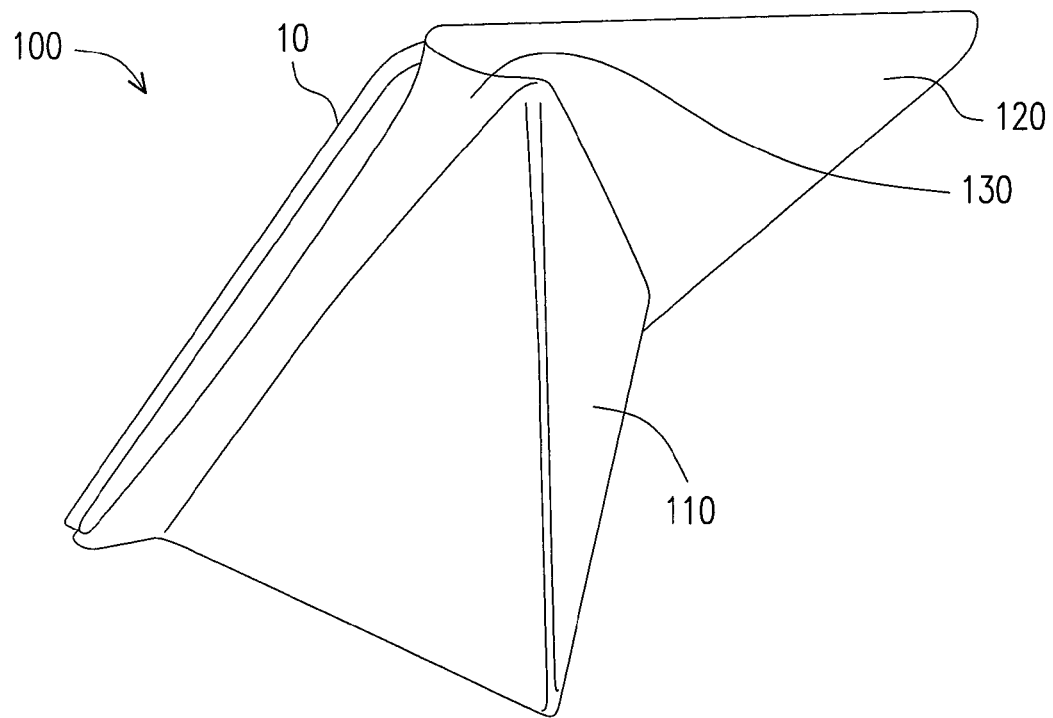

FIG. 1C is a three dimensional schematic view of the foldable cover of FIG. 1A that is folded. FIG. 1D to FIG. 1F are three dimensional schematic views of the foldable cover of FIG. 1A deforming to support the portable electronic device. As shown in FIG. 1C, the first separation 112 is bent along two adjacent fixing parts 116a on the supporting unit 110, so that the two adjacent fixing parts 116a lean against each other.

After the two fixing parts 116a are combined, the supporting unit 110 forms a three dimensional structure (as shown in FIG. 1D), so as to support the portable electronic device 10. In the embodiment, the three dimensional structure that is formed after the supporting unit 110 of the foldable cover 100 is deformed is a pyramid.

As shown in FIG. 1D to FIG. 1F, the supporting unit 110 can form a pyramid to support the portable electronic device 10 so that the user can place the portable electronic device 10 vertically or horizontally onto a table. Since the pyramid that the supporting unit 110 forms after being deformed is not an equilateral pyramid, thus, when different sides of the pyramid with different shapes are placed on the table, the portable electronic device 10 of the fixing unit 120 will prop against the pyramid at different angles.

In the embodiment, two fixing parts 116a are magnetic. When two fixing parts 116a of two first slab-shaped parts 116 are leaned against each other, the two fixing parts 116a will be fixed to each other through attraction, to maintain the pyramid shape. Of course, the fixing parts 116a can also be locked or adhered together, and the method for fixing the fixing parts 116a is not limited thereto.

In addition, since the fixing unit 120 is connected to the supporting unit 110 through the connection member 130, when the supporting unit 110 forms a three dimensional structure, the fixing unit 120 can lean against the surface of the three dimensional structure. Thus, regardless of whether the foldable cover 100 is used to protect or support the portable electronic device 10, the portable electronic device 10 does not need to be removed from the fixing unit 120.

When the foldable cover 100 is used to support the portable electronic device 10, the connection member 130 is bent at different portions to adjust the angle of the portable electronic device (FIG. 1D to FIG. 1E) or the position between the three dimensional structure and the portable electronic device 10 (FIG. 1F), so that the three dimensional structure is closer to the center of the portable electronic device 10.

Figure 2:
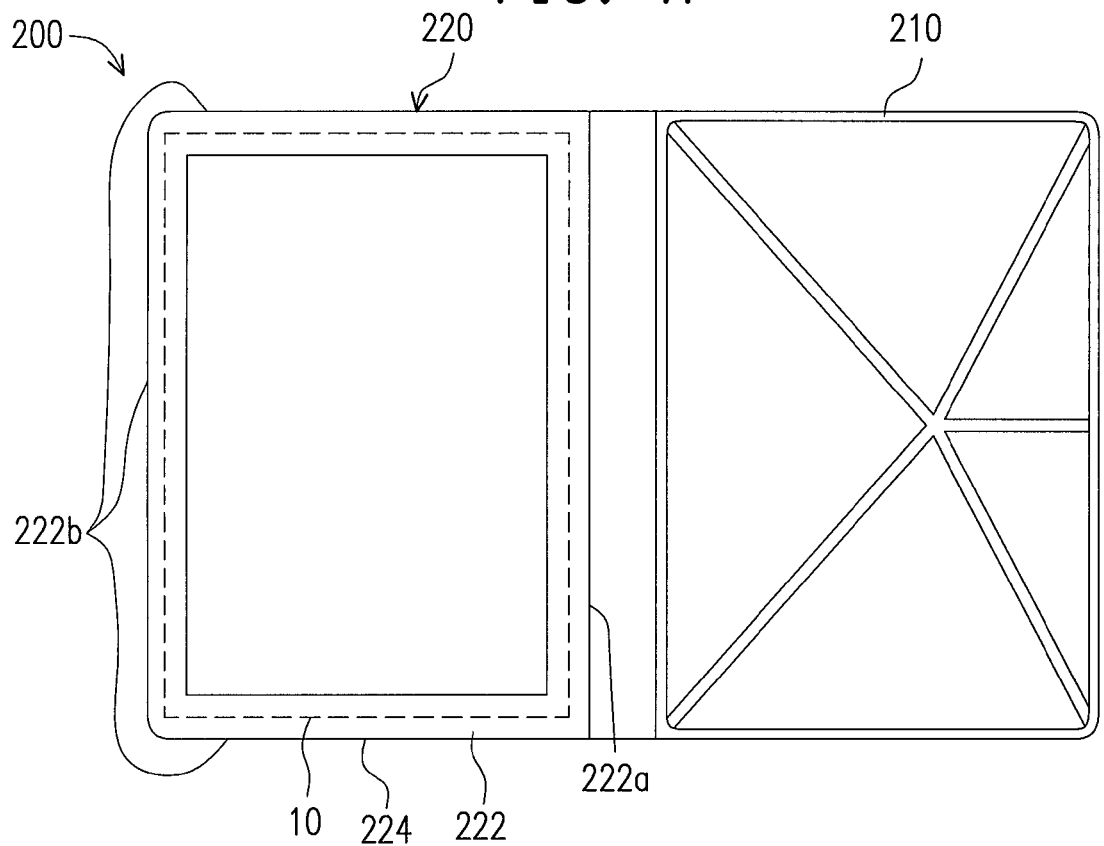
FIG. 2 is a top view illustrating a foldable cover according to a second embodiment of the disclosure.

FIG. 2 is a top view illustrating a foldable cover according to a second embodiment of the disclosure. The only difference between the embodiment of FIG. 2 and the embodiment of FIG. 1 is the type of the fixing unit. As seen in FIG. 2, the fixing unit 220 of the foldable cover 200 of the embodiment comprises an inner surface 222 and an outer surface 224.

The inner surface 222 comprises an inner edge 222a, and three outer edges 222b. The inner edge 222a of the inner surface 222 close to the supporting unit 210 is not connected to the outer surface 224, and the other three outer edges 222b are flexibly connected to the outer surface 224. The shape of the inner surface 222 is a hollow rectangle, and the material of the inner surface 222 is a soft material, such as leather.

When the portable electronic device 10 is put in or taken out of the fixing unit 220, the inner edge 222a of the inner surface 222 of the fixing unit 220 is pulled away from the outer surface 224 of the fixing unit 220. The inner surface 222 will slightly deform so that the portable electronic device 10 can be put in or taken out of the fixing unit 220. When the portable electronic device 10 is located in the fixing unit 220, the portable electronic device 10 is clamped between the inner surface 222 and the outer surface 224 of the fixing unit 220 so that it will not fall out.

Figure 3A:
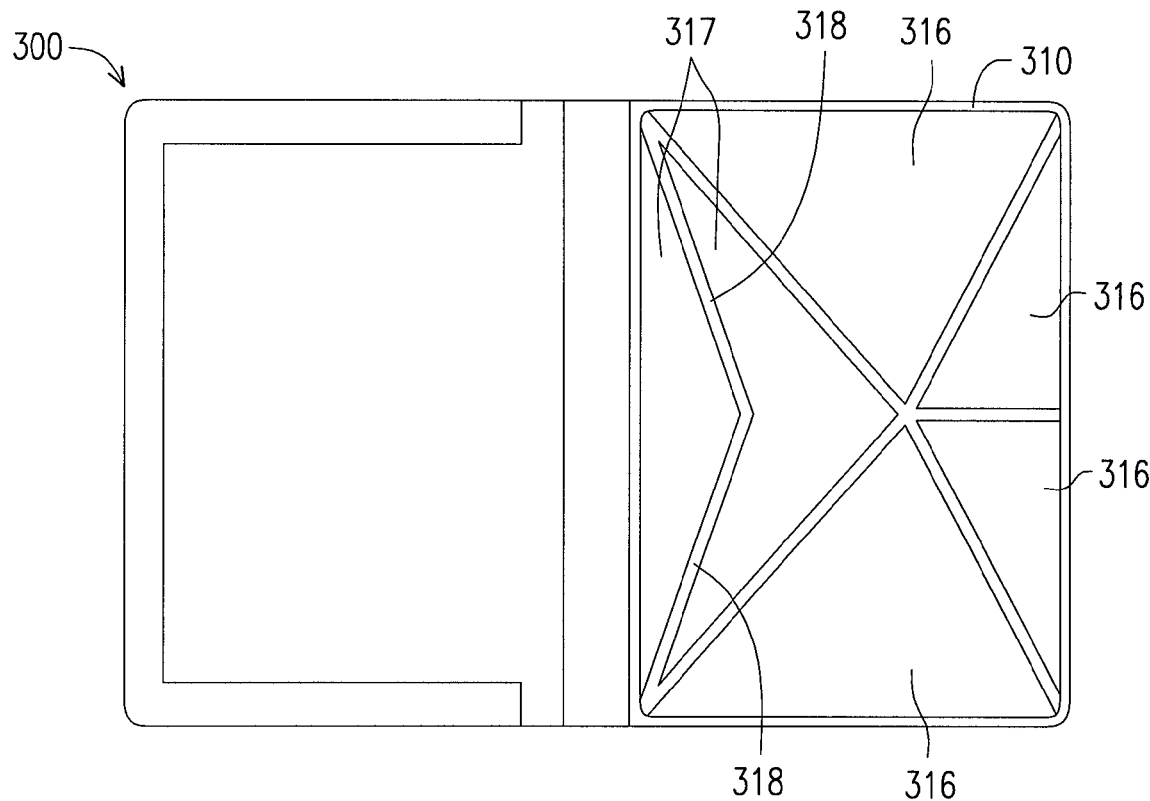
FIG. 3A is a top view illustrating a foldable cover according to a third embodiment of the disclosure.

FIG. 3A is a top view illustrating a foldable cover according to a third embodiment of the disclosure. As seen in FIG. 3A, the difference between the foldable cover 300 of the embodiment and the foldable cover 100 of FIG. 1A is that the supporting unit 310 of the embodiment further comprises two second slab-shaped parts 317 and a pair of second separations 318. An end of each of the two second separations 318 are connected to each other. The two separations 318 separate parts of the supporting unit 310, so as to divide out two second slab-shaped parts 317.

Figure 3B:
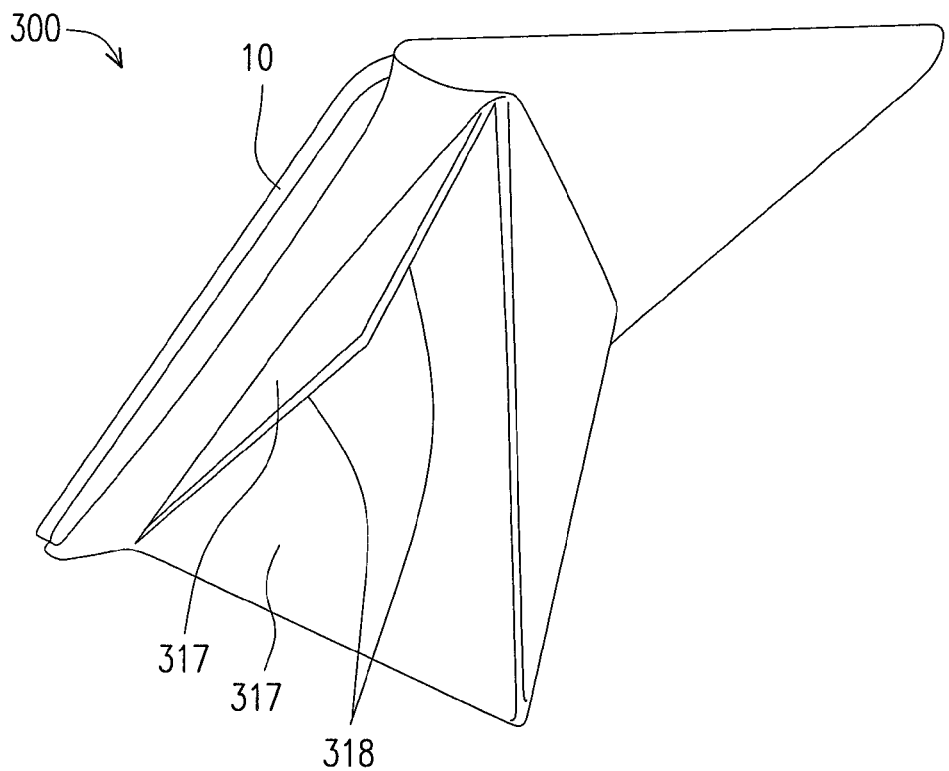
FIG. 3B is a three dimensional schematic view of the foldable cover of FIG. 3A deforming to support the portable electronic device.

FIG. 3B is a three dimensional schematic view of the foldable cover of FIG. 3A deforming to support the portable electronic device. As seen in FIG. 3B, the bending along the second separations 318 cause the two slab-shaped parts 317 to be located on different surfaces. This way, the center of gravity of the three dimensional structure that is formed by the supporting unit 310 is moved, so as to increase the stability of the three dimensional structure, or to adjust the angle of the portable electronic device 10. Of course, the supporting unit 310 can also include a plurality of pairs of second separations 318, so as to satisfy different user requirements.

Figure 4:
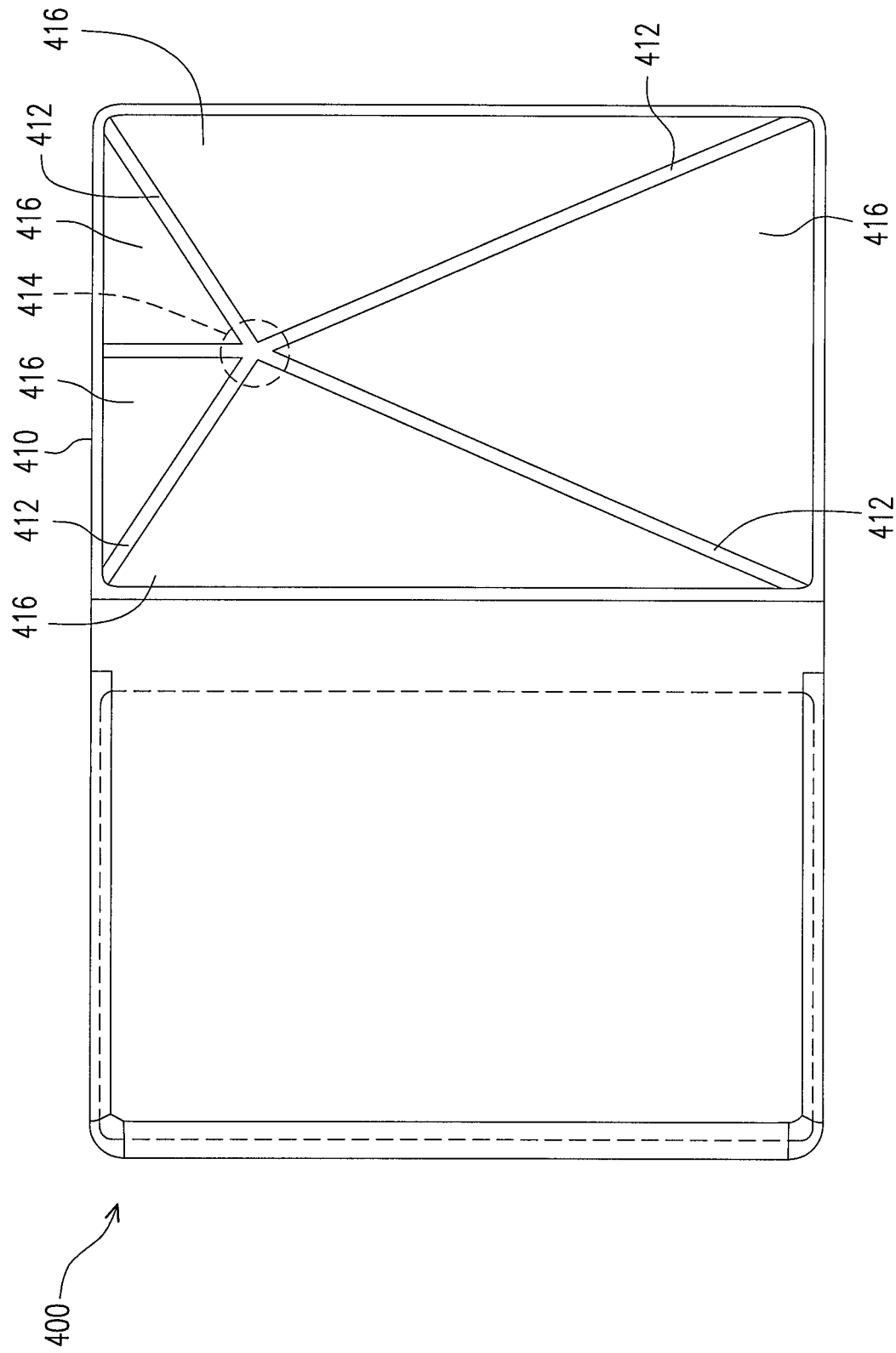
FIG. 4 is a top view illustrating a foldable cover according to a fourth embodiment of the disclosure.

FIG. 4 is a top view illustrating a foldable cover according to a fourth embodiment of the disclosure. As seen in FIG. 4, the supporting unit 310 of the foldable cover 400 of the embodiment provides another type of distribution of the first separations 412, the convergent part 414, and the first slab-shaped parts 416.

In the embodiment, the shape of the supporting unit 410 is a rectangle, with two long sides and two short sides. The convergent part 414 is located on a perpendicular bisector of the short side of the supporting unit 110. One of the first separations 412 is simultaneously located on the perpendicular bisector. It can be seen from the embodiment and the embodiment of FIG. 1A that the alignment and length of the first separations 412, 112 and the shape of the first slab-shaped parts 416, 116, are different based on the different positions of the convergent parts 414, 114.

Figure 5:
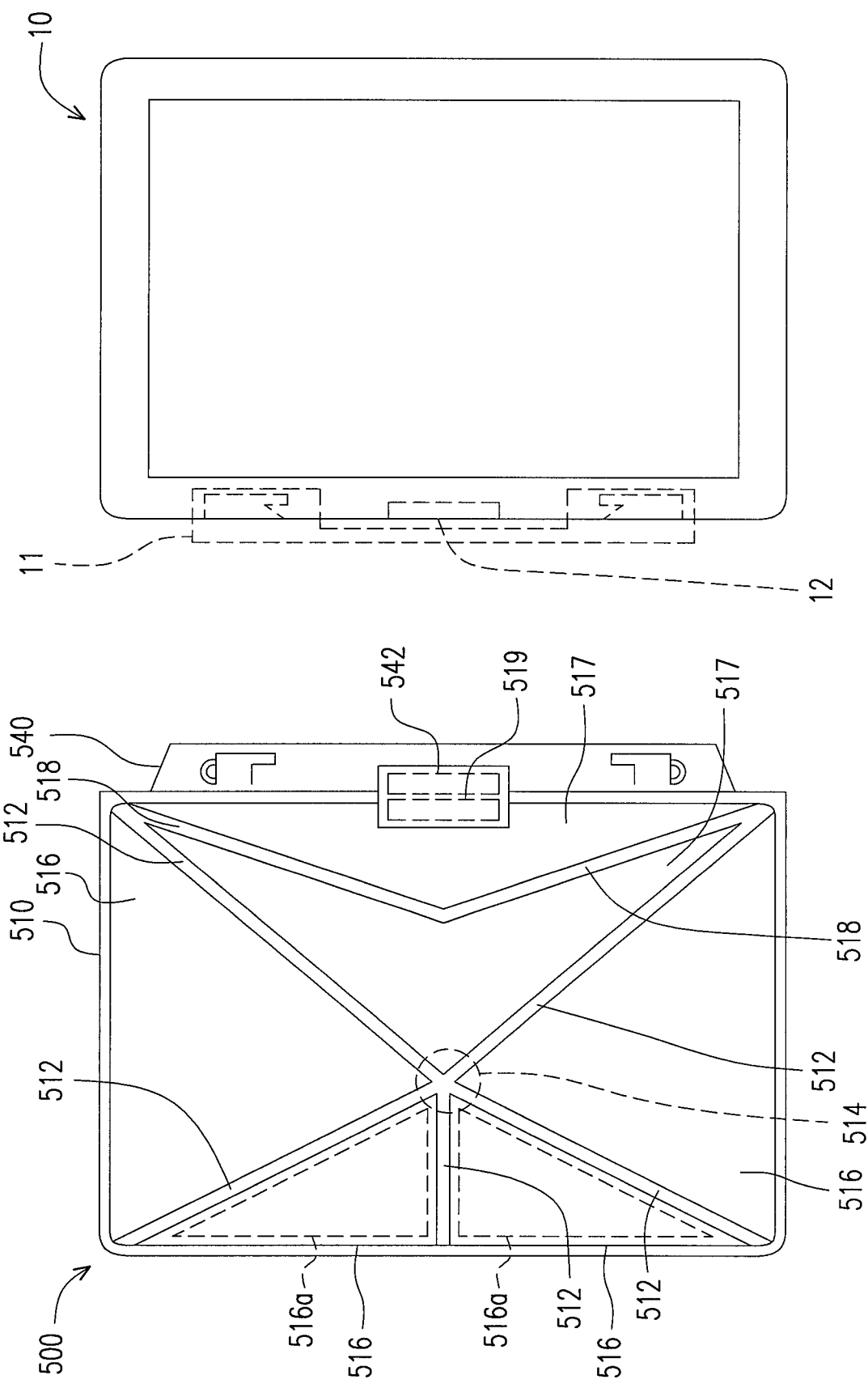
FIG. 5 is a top view illustrating a foldable cover according to a fifth embodiment of the disclosure.

FIG. 5 is a top view illustrating a foldable cover according to a fifth embodiment of the disclosure. As seen in FIG. 5, the supporting unit 510 of the foldable cover 500 of the embodiment comprises a plurality of first separations 512, a convergent part 514, a plurality of first slab-shaped parts 516, two second slab-shaped parts 517, and a pair of second separations 518.

Each of the first separations 512 is connected to the convergent part 514, and partitions the first slab-shaped parts 516. An end of the two second separations 518 respectively connect to each other, and two second slab-shaped parts 517 are partitioned by two second separations 518. Bending along the second separations 518 can cause two sides of the two slab-shaped parts 517 to be located on different surfaces. This way, the center of gravity of the three dimensional structure that is formed by the supporting unit 510 is moved, so as to increase the stability of the three dimensional structure.

In addition, the fixing unit of the foldable cover 500 of the embodiment further comprises a first locking assembly 540. The first locking assembly 540 is flexibly connected to the supporting unit 510. The portable electronic device 10 comprises a second locking assembly 11, wherein the first locking assembly 540 is used to lock to the second locking assembly 11. When using the foldable cover 500 of the embodiment to protect the portable electronic device 10, the supporting unit 510 of the embodiment covers a face of the portable electronic device 10 by rotating about the first locking assembly 540 as the rotation axis. For example, the supporting unit 510 can cover the screen of the portable electronic device 10, so as to lower the chance of scratching the screen.

The portable electronic device 10 usually comprises a transmission interface 12, so as to transmit data or power. When the using the foldable cover 500 of the embodiment to support the portable electronic device 10, in order to use the portable electronic device 10 at the same time, and perform data transmission or power charging, the locking assembly 540 of the embodiment comprises a first through hole 542.

The supporting unit 510 further comprises a second through hole 519. The first through hole 542 connects through the second through hole 519. When the foldable cover 500 is connected to the portable electronic device 10, the transmission interface 12 is exposed by the first through hole and the second through hole, so that external apparatuses can pass through the first through hole 542 and the second through hole 519 to connect to the transmission interface 12.

Figure 6A:
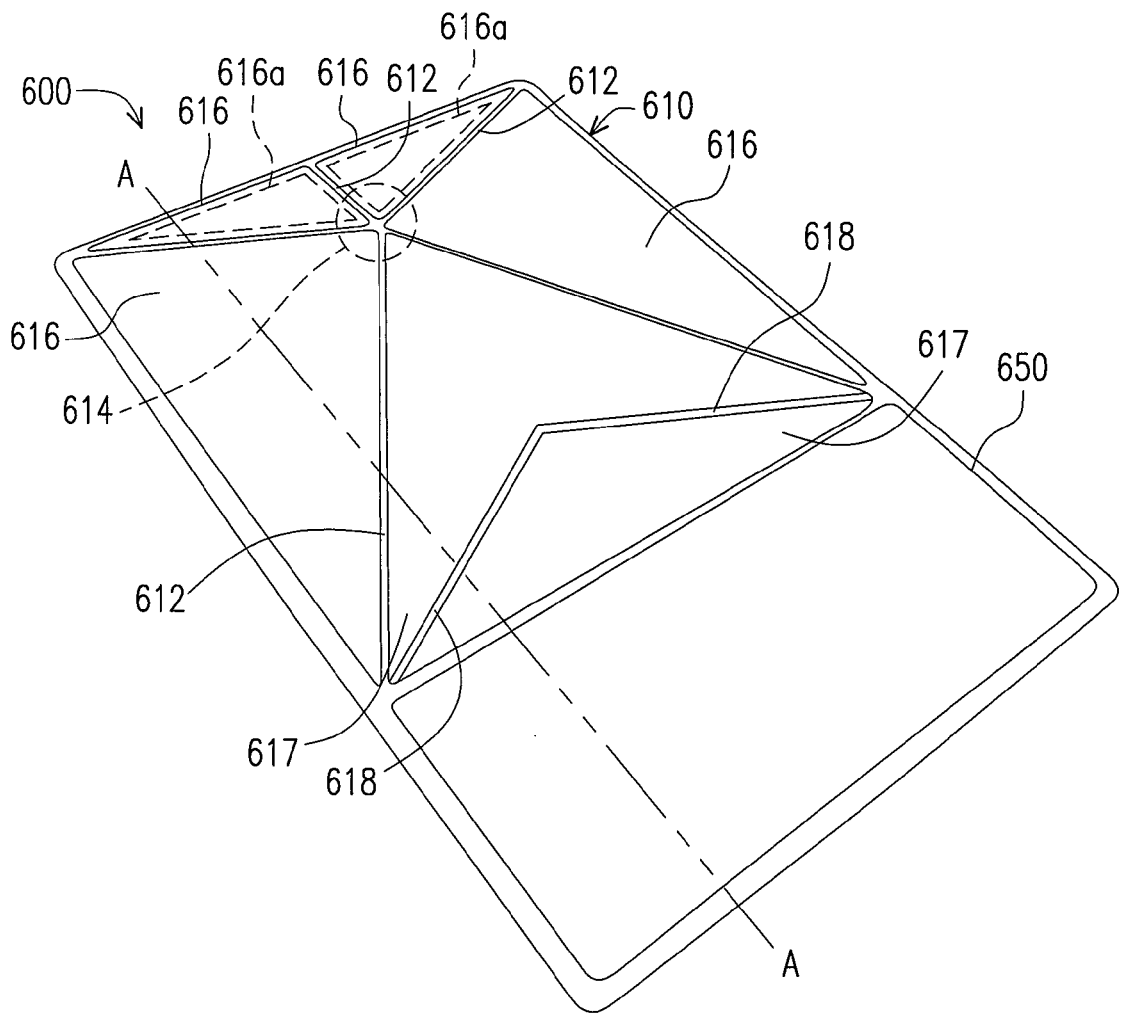
FIG. 6A is a three dimensional schematic view illustrating a foldable cover according to a sixth embodiment of the disclosure.
Figure 6B:
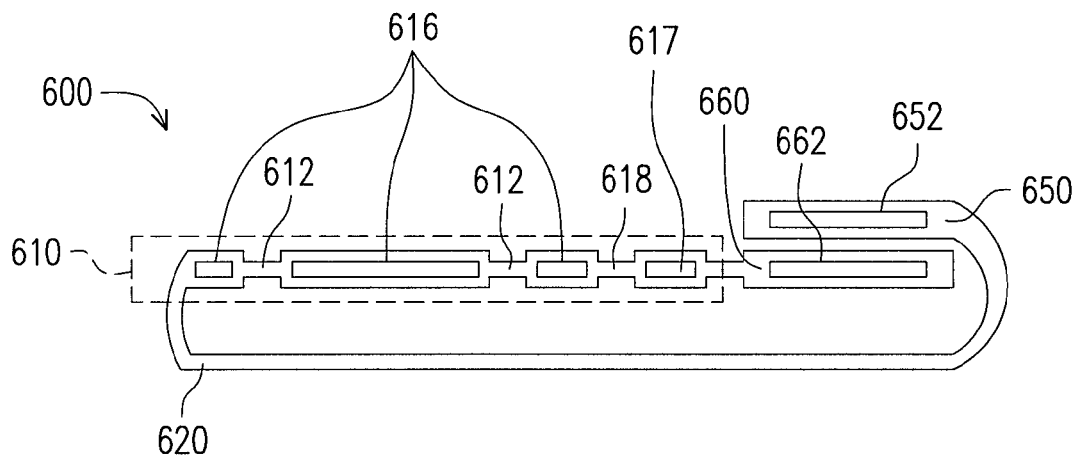
FIG. 6B is a cross-sectional schematic view of the foldable cover along line A-A in FIG. 6A.

FIG. 6A is a three dimensional schematic view illustrating a foldable cover according to a sixth embodiment of the disclosure. FIG. 6B is a cross-sectional schematic view of the foldable cover along line A-A in FIG. 6A. In the embodiment, the supporting unit 610 and the fixing unit 620 form a cover body. The fixing unit 620 is made of soft material, such as cloth or leather, and can bend with the supporting unit 610. When the foldable cover 600 is used to protect the portable electronic device 10, the portable electronic device 10 is located between the supporting unit 610 and the fixing unit 620.

The foldable cover 600 further comprises a first extension element 650 and a second extension element 660. The first extension element 650 is flexibly connected to one of the fixing unit 620 or the supporting unit 610. The second extension element 660 is flexibly connected to the fixing unit 620 or the supporting unit 610 not connected to the first extension element 650.

In the embodiment, the first extension element 650 is connected to the fixing element 620, and the second extension element 660 is connected to the supporting element 610. The first extension element 650 is movably fixed to the second extension element 660, so that the portable electronic device 10 is restricted between the supporting element 610 and the fixing element 620.

In addition, the supporting unit 610 respectively comprises a plurality of first separations 612, a convergent part 614, a plurality of first slab-shaped parts 616, two second slab-shaped parts 617, and a pair of second separations 618. Each of the first separations 612 is connected to the convergent part 614, and can partition two adjacent first slab-shaped parts 616. In these first slab-shaped parts 616, two adjacent first slab-shaped parts 616 respectively include a fixing part 616a. The two fixing parts 616a can be fixed together through multiple methods.

In the embodiment, the two fixing parts 616a include a magnetic function. The fixing parts 616a are magnetically fixed to each other when leaned together. However, the method of fixing the two fixing parts 616a is not limited thereto. In addition, in the embodiment, at least one perpendicular bisector of the supporting unit 610 passes through the convergent part 614.

An end of each of the second separations 618 is connected to each other, and two second separations 618 partition two adjacent first slab-shaped parts 617.

In the embodiment, the shape of the supporting unit 610 is a rectangle. The shapes of the pair of fixing parts 616a are similar triangles. The first extension element 650 is movably fixed to the second extension element 660, so as to assure that the portable electronic device 10 is located in the foldable cover.

The first extension element 650 comprises a third slab-shaped part 652, and the second extension element 660 comprises a fourth slab-shaped part 662. In the embodiment, the third slab-shaped part 652 and the fourth slab-shaped part 662 are magnetic elements.

Figure 6C:
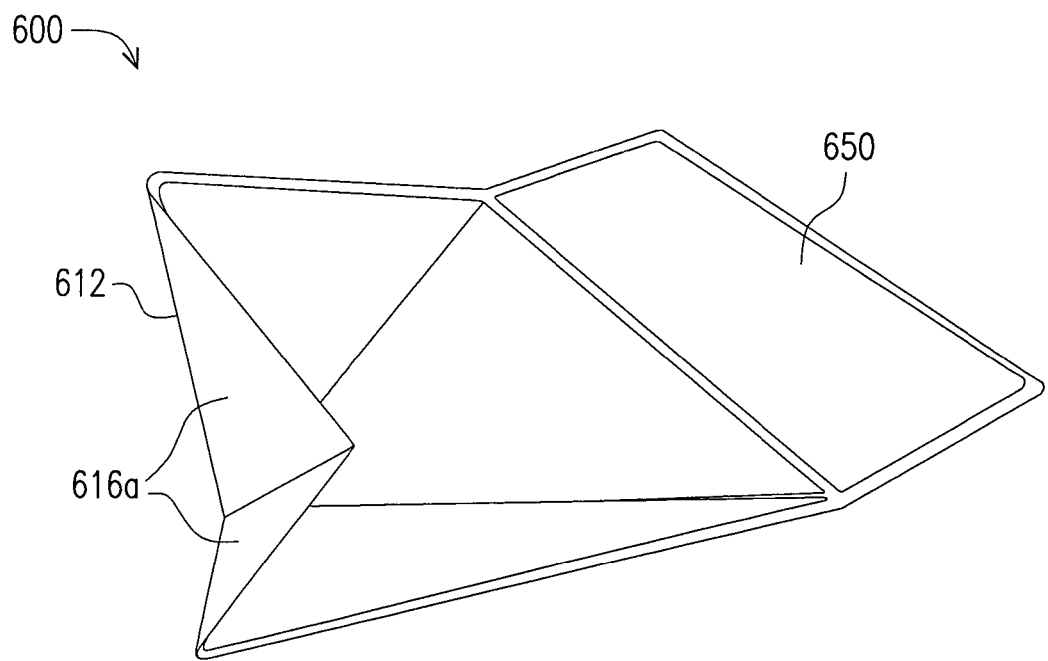
FIG. 6C is a three dimensional schematic view of the foldable cover of FIG. 6A that is folded.

FIG. 6C is a three dimensional schematic view of the foldable cover of FIG. 6A that is folded. When using the foldable cover 600 of the embodiment to support the portable electronic device 10, as seen in FIG. 6C, bending the first separation 612 between the two fixing parts 616a causes the two fixing parts 616a to lean together.

Figure 6D:
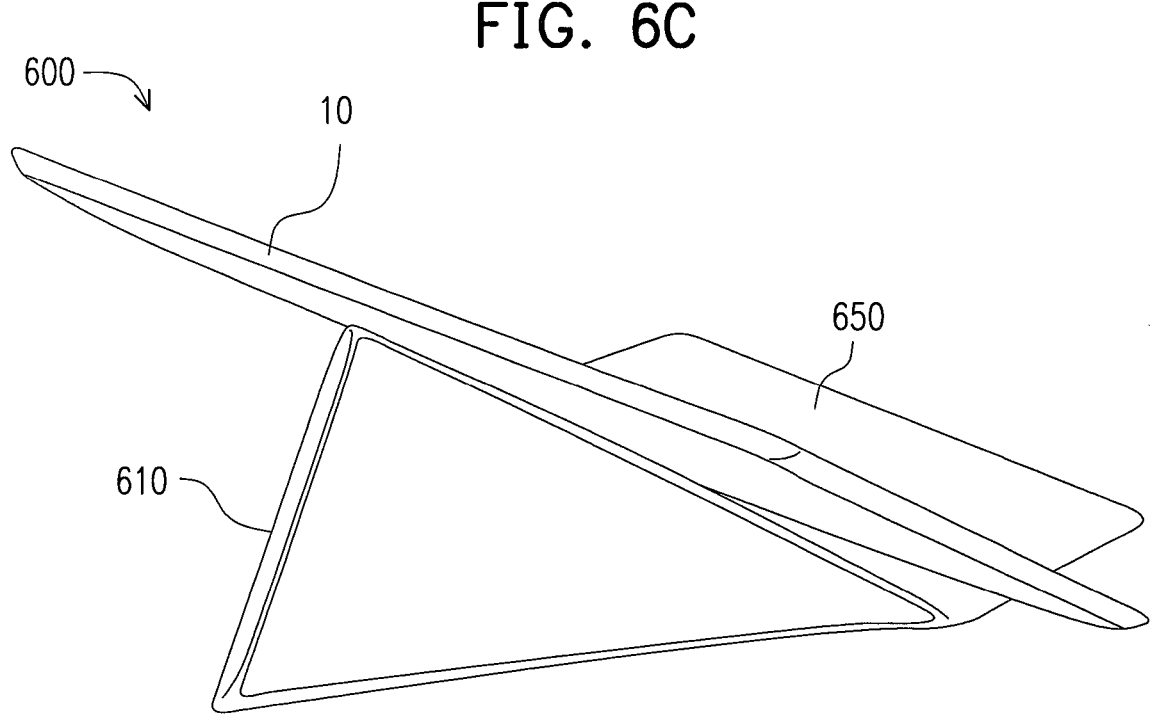
FIG. 6D to FIG. 6F are three dimensional schematic views of the foldable cover of FIG. 6A deforming to support the portable electronic device.
Figure 6E:
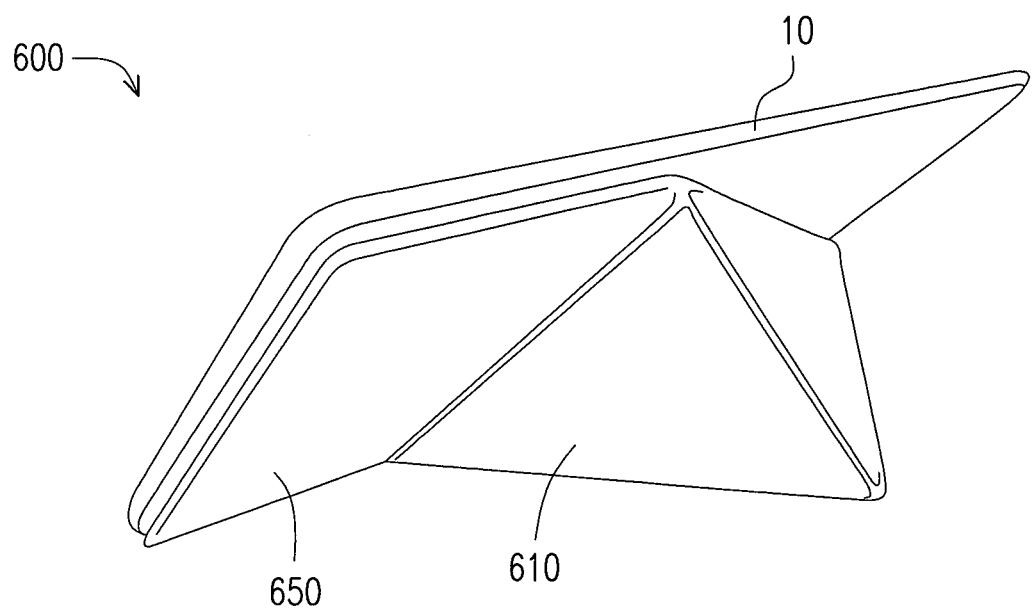
Figure 6F:
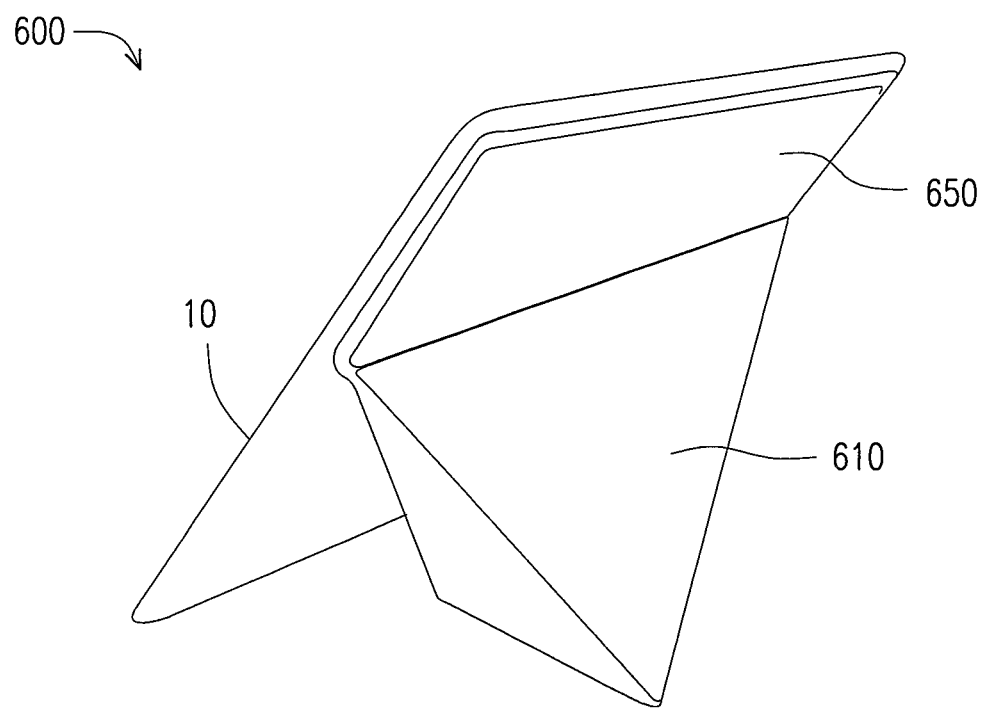

FIG. 6D to FIG. 6F are three dimensional schematic views of the foldable cover of FIG. 6A deforming to support the portable electronic device. When using the foldable cover 600 of the embodiment to support the portable electronic device 10, by leaning together and fixing the fixing parts 616a, the supporting unit 610 and the fixing unit 620 deform to form a three dimensional structure. As seen in FIG. 6D to FIG. 6F, the user can place the portable electronic device 10 on any side of the three dimensional structure, so that the portable electronic device can be erected at different directions and angles.

Figure 7A:
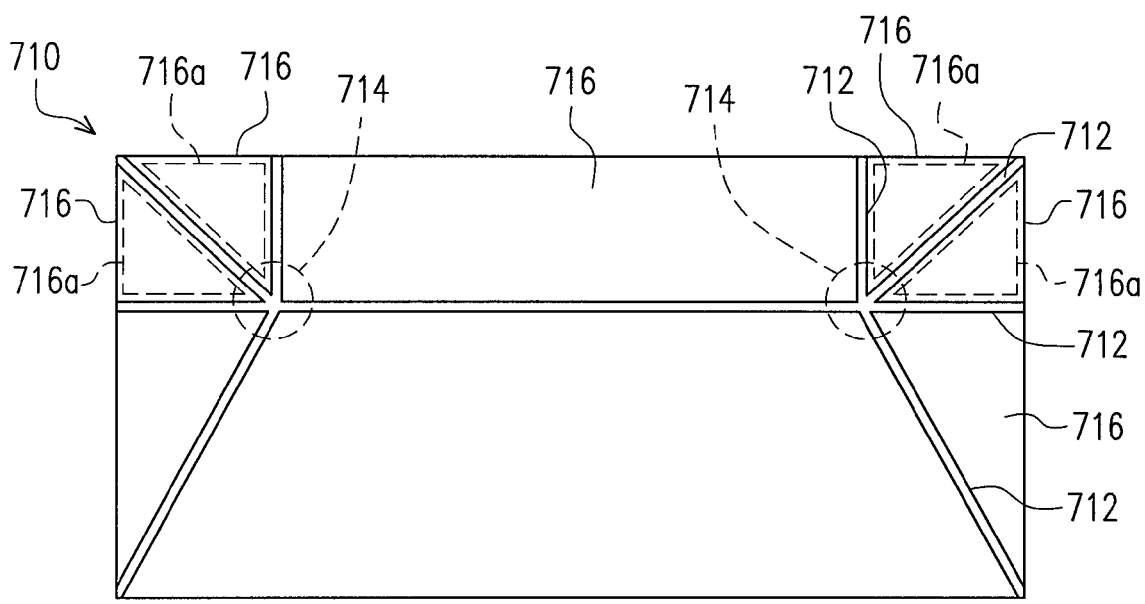
FIG. 7A is a top view illustrating a foldable cover according to a seventh embodiment of the disclosure.
Figure 7B:
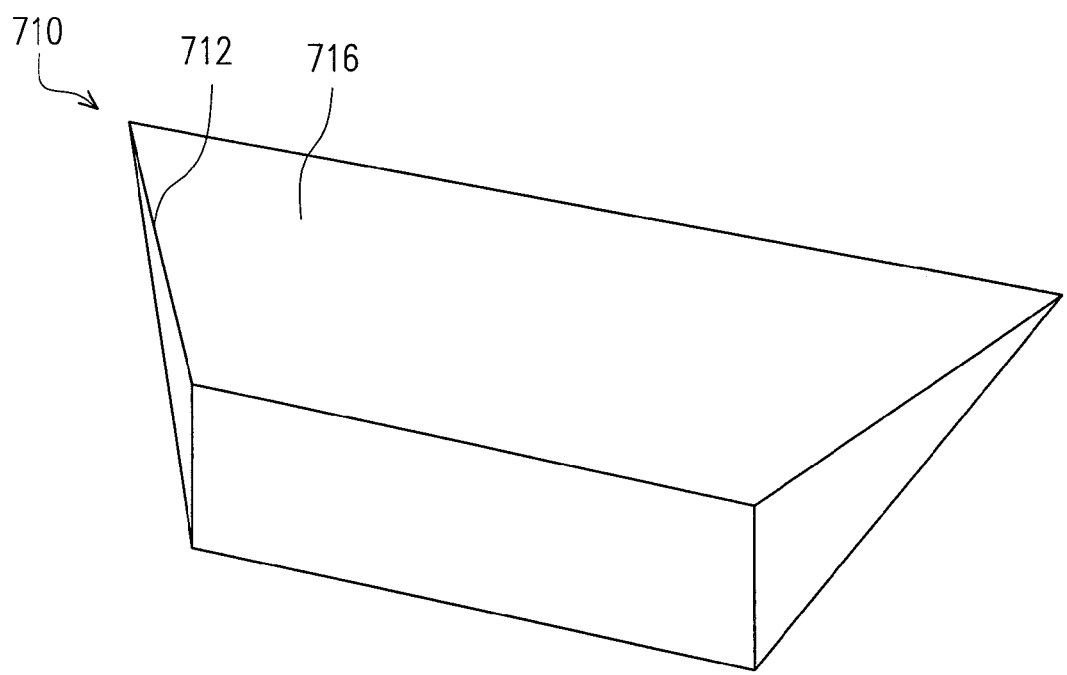
FIG. 7B is a three dimensional schematic view of a supporting unit of the FIG. 7A that is folded and deformed.

FIG. 7A is a top view illustrating a foldable cover according to a seventh embodiment of the disclosure. FIG. 7B is a three dimensional schematic view of a supporting unit of the FIG. 7A that is folded and deformed. Referring to FIG. 7A and FIG. 7B, the supporting unit 710 comprises a plurality of first separations 712, a plurality of convergent parts 714, and a plurality of first slab-shaped parts 716. In the embodiment, the amount of the convergent parts 714 is two. However, the amount of the convergent parts 714 is not limited thereto.

Each of the first separations 712 is connected to one of the two convergent parts 714, and each of the first separations 712 can partition two adjacent first slab-shaped parts 716. The two sets of adjacent first slab-shaped parts 716 respectively include a pair of fixing parts 716a. When using the supporting unit 710 to support the portable electronic device 10, respectively bending the two first separations 712 between the pair of fixing parts 716a causes the two fixing parts 716a to lean and be fixed together. This way the supporting unit 710 is erected (as shown in FIG. 7B), so as to support the portable electronic device 10.

To sum up, the foldable cover of the disclosure not only covers the portable electronic device, but can also conveniently deform to turn into a support frame and support the portable electronic device. In addition, the foldable cover of the disclosure can be placed in multiple directions so as to provide multiple angles to support the portable electronic device. Thus, the foldable cover of the disclosure comprises advantages of simple operation, unique forms, multiple functions, and the weight and volume of portable objects to decreasing the user's loading.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A foldable cover, adapted for a portable electronic device, the foldable cover comprising:
   a supporting unit, including a plurality of first separations, a convergent part, and a plurality of first slab-shaped parts, wherein each of the first separations is connected to the convergent part, two adjacent first slab-shaped parts respectively include a fixing part, wherein the two fixing parts are magnetic elements; and
   a fixing unit, connected to the supporting unit to fix the portable electronic device;
   wherein, when the first slab-shaped parts are disposed on the same surface, the supporting unit covers the portable electronic device; and
   when a three dimensional structure is formed by the first separations, the convergent part, and the first slab-shaped parts, the supporting unit supports the portable electronic device and the two fixing parts of the two adjacent first slab-shaped parts are leaned against each other through attraction.

2. The foldable cover as claimed in claim 1, wherein the three dimensional structure is a pyramid.

3. The foldable cover as claimed in claim 1, wherein the supporting unit further comprises a plurality of second separations, and each of the second separations partitions a plurality of second slab-shaped parts.

4. The foldable cover as claimed in claim 1, further comprising a connection member, so as to connect the supporting unit and the fixing unit.

5. The foldable cover as claimed in claim 1, wherein the fixing unit is a first locking assembly, the portable electronic device comprises a second locking assembly, and the first locking assembly is adapted to lock to the second locking assembly.

6. The foldable cover as claimed in claim 5, wherein the first locking assembly comprises a first through hole, and the portable electronic device comprises a transmission interface, when the foldable cover is connected to the portable electronic device, a position of the first through hole corresponds to a position of the transmission interface.

7. The foldable cover as claimed in claim 1, wherein the supporting unit and the fixing unit form a cover body, when the foldable cover protects the portable electronic device, the portable electronic device is located between the supporting unit and the fixing unit.

8. The foldable cover as claimed in claim 7, further comprising:
   a first extension element, connected to one of the fixing unit and the supporting unit; and
   a second connection member, connected to the fixing unit or the supporting unit that is not connected to the first extension element, wherein the first extension element is movably fixed to the second extension element so that the portable electronic device is restricted between the supporting unit and the fixing unit.

* * * * *